(12) United States Patent
Povzner et al.

(10) Patent No.: US 8,019,765 B2
(45) Date of Patent: Sep. 13, 2011

(54) IDENTIFYING FILES ASSOCIATED WITH A WORKFLOW

(75) Inventors: Anna Povzner, San Jose, CA (US); Kimberly Keeton, San Francisco, CA (US); Marcos K. Aguilera, Mountain View, CA (US); Arif A. Merchant, Los Altos, CA (US); Charles B. Morrey, III, Palo Alto, CA (US); Mustafa Uysal, Vacaville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 460 days.

(21) Appl. No.: 12/260,836

(22) Filed: Oct. 29, 2008

(65) Prior Publication Data
US 2010/0106681 A1   Apr. 29, 2010

(51) Int. Cl.
*G06F 17/30* (2006.01)
(52) U.S. Cl. ........................................ 707/739; 707/740
(58) Field of Classification Search .................. 707/739, 707/740
See application file for complete search history.

(56) References Cited

U.S. PATENT DOCUMENTS

2008/0040538 A1* 2/2008 Matsuzawa et al. .......... 711/113
2008/0162199 A1* 7/2008 Smith et al. ........................ 705/5

OTHER PUBLICATIONS

B.M. Nagarajan, U.S. Appl. No. 11/742,535, entitled "Document Classification Using Semantic Relationships," filed Apr. 30, 2007, pp. 1-29, Figs. 1-9.
Fung et al., "Hierarchical Document Clustering Using Frequent Itemsets," Proceedings of the SIAM International Conference on Data Mining, pp. 1-12 (2003).
X. Yan et al., "CloSpan: Mining Closed Sequential Patterns in Large Datasets," Proceedings of the SIAM International Conference on Data Mining, pp. 1-12 (2003).
E. Anderson et al., "Value-Maximizing Deadline Scheduling and its Application to Animation Rendering," ACM Symposium on Parallel Algorithms and Architectures. pp. 1-10 (2005).
R. Agrawal et al., "Mining Association Rules between Sets of Items in Large Databases," ACM SIGMOD Record, vol. 22, Issue 2, pp. 207-216 (Jun. 1993).

(Continued)

*Primary Examiner* — John E Breene
*Assistant Examiner* — Dennis Myint (57) ABSTRACT

To determine files associated with one or more workflows, a trace of accesses of files in at least one server is received. The files are grouped into at least one set of files, where the files in the set are accessed together more than a predetermined number of times in the trace. Files associated with the particular workflow are identified based on the at least one set.

21 Claims, 4 Drawing Sheets

OTHER PUBLICATIONS

J. Griffioen et al., "Reducing File System Latency using a Predictive Approach," Technical Report #CS247-94, Proceedings of the USENIX Summer 1994 Technical Conference on USENIX Summer 1994 Technical Conference—vol. 1, pp. 1-12 (Jun. 1994).

K. Muniswamy-Reddy et al., "Provenance-Aware Storage Systems," Proceedings of the annual conference on USENIX '06 Annual Technical Conference, pp. 1-14 (2006).

J.J. Kistler et al., "Disconnected Operation in the Coda File System," ACM Transactions on Computer Systems (TOCS), vol. 10, Issue 1, pp. 1-25 (Feb. 1992).

T.M. Kroeger et al., "Predicting File System Actions from Prior Events," Proceedings of the annual conference on USENIX Annual Technical Conference, pp. 1-10 (1996).

G.H. Kuenning et al., "Automated Hoarding for Mobile Computers," Proceedings of the 16th ACM Symposium on Operating Systems Principles, pp. 264-275 (1997).

Z. Li et al., "C-Miner: Mining Block Correlations in Storage Systems," Proceedings of the 3rd USENIX Conference on File and Storage Technologies, pp. 173-186 (2004).

P. Lyman et al., "How Much Information", 2003, file://///Herald/www/research/projects/how-much-info-2003/execsum.htm, pp. 1-112 (Oct. 2003).

S. Shah et al., "Using Provenance to Aid in Personal File Search," 2007 USENIX Annual Technical Conference, pp. 171-184 (2007).

C. Soules et al, "Connections: Using Context to Enhance File Search," ACM SIGOPS Operating Systems Review, vol. 39, Issue 5, pp. 119-132 (2005).

M.J. Zaki, "SPADE: An Efficient Algorithm for Mining Frequent Sequences '"Machine Learning, 0, pp. 1-31 (2000).

Nagarajan et al., U.S. Appl. No. 11/742,535 entitled Document Classification Using Semantic Relationships filed on Apr. 30, 2007 (41 pages).

Povzner et al., Autograph: Automatically Extracting Workflow File Signatures, Jan. 2009 (8 pages).

Zaki et al., Charm: An Efficient Algorithm for Closed Itemset Mining, Apr. 2002 (17 pages).

\* cited by examiner

IDENTIFYING FILES ASSOCIATED WITH A WORKFLOW

BACKGROUND

In the course of performing work in various systems (e.g., storage systems, computer systems, etc.), it is often desirable to identify files that are related to each other. Identifying related files (into corresponding groups) can be relatively complex, particularly in large systems containing a relatively large number of files, since files may span multiple directories, one directory may contain files for multiple groups, or files may be shared by several groups.

In some cases, the identification of related files can be performed manually, which is tedious and time consuming. Other conventional techniques focus on identifying relationships between files based on temporal locality, which is according to the observation that related files are usually accessed close to each other in time. The temporal locality techniques in some scenarios may capture spurious, coincidental relationships between files, such as when a user is listening to music while authoring a document.

Another conventional technique is based on the ability to track reads and writes to files within the same process, as well as track inter-process communications. However, this latter technique involves the use of relatively detailed system call information that may be available in local client machines, but which may not be available in other types of systems. As a result, application of this technique may not be possible in contexts where such detailed information is not available.

BRIEF DESCRIPTION OF THE DRAWINGS

Some embodiments of the invention are described, by way of example, with respect to the following figures.

DETAILED DESCRIPTION

In accordance with some embodiments, a technique for determining files associated with a particular workflow is provided. A "workflow" (or "application workflow") refers to a process or group of operations contributing to an end goal. Examples of workflows include the following: an animation rendering workflow that executes one or more rendering applications to produce an image or animation sequence; a software build or compile workflow that produces a specific software application from source code; which may involve invoking compilers of several languages; a testing workflow that involves the running of a batch script to execute an experiment and to process results; and other workflows.

Generally, a workflow may have one or more of the following properties: the workflow may occur by itself within a system; the workflow tends to recur over time; and each recurrence involves some amount of repetition of work. Multiple workflows may execute at the same time, and their file signatures (files accessed by each workflow) may overlap. Generally, workflows are relatively highly repeatable. For example, during production of an animated movie, the same frame can be rendered many times. As another example, when developing, testing, and debugging source code, a source package may be compiled and recompiled hundreds of times. Each occurrence (or instance) of a particular workflow is referred to as an "episode." A repeatable workflow will have multiple episodes.

Determining files associated with a particular workflow, in accordance with some embodiments, is based on a trace of file accesses occurring at a server, such as a file server of a storage system, a web server, a call server (in telecommunications networks), and so forth. A "trace" refers to some sequence or other collection of information relating to access of files. A "server" refers to a machine (e.g., computer, switch, etc.) that is able to receive requests from one or more requesting machines (also referred to as "clients"), and to process such requests to produce results that may be returned to the clients (or stored in the servers). Generally, information relating to file accesses at a file server (or other type of server) may be relatively limited, and may exclude information that is typically available with local machine traces (such as traces performed at a client computer). For example, information relating to accesses of files at a server may exclude the following information that may be available with a trace at a client: summary information such as process identifiers, names, or command-line arguments; process creation or termination information; explicit file lifetime information (e.g., information relating to file opens and closes), and so forth. In accordance with some embodiments, a technique is provided to determine files associated with a particular workflow even though the trace of file accesses at a server may include relatively limited information.

Note that identifying workflow file signatures based on traces at a server, rather than clients, can be beneficial because more important files are kept at servers rather than clients, and such files can be accessed by multiple clients. Moreover, since there are usually many more clients than servers, implementing some embodiments at the server side may be more efficient.

As used here, a "file" can refer to any unit of data, where the unit of data can be any one or more of the following: collection or block of data bits, string of characters, image data, audio data, multimedia data, text data, and so forth. A "file server" refers to a system that controls access (read or write) of files stored in a storage system that the file server is associated with. One example type of file server is a file system server such as a network file system (NFS) server. Alternatively, the server at which file accesses are traced can be a web server, such as a Hypertext Transfer Protocol (HTTP) server. In this context, files accessed at the web server may include web pages, scripts, images, audio files, and so forth.

In the ensuing discussion, reference is made to "file servers." However, note that the techniques described are also applicable to other types of servers.

The technique according to some embodiments for determining files associated with a particular workflow includes the following tasks: (1) trace capture to capture a trace of input/output (I/O) accesses at a file server (or multiple file servers); (2) trace preprocessing to extract operations of interest and divide the trace into shorter access sequences; (3) frequent file set extraction to pick out frequently occurring sets of file accesses, where each set of file accesses represents file accesses that appear together (that are correlated); and (4) clustering to group the frequently occurring sets of file accesses to reconstruct a workflow's file signature (group of files that are associated with the workflow).

Determining file signatures for workflows may be useful for one or more of the following tasks. The workflow file signatures can be used to manage file placement in tiered storage systems. Storage systems often have multiple storage tiers with different costs and capabilities. Choosing which files to place in each tier can be relatively complex task, as files related to the same workflow should be placed in the same tier. Workflow file signatures can also be useful for understanding utilization of storage resources. Often, storage administrators want to know how applications and projects use storage capacity and bandwidth. This knowledge is useful for budgeting, billing, and making resource provisioning decisions based on business goals.

Workflow file signatures are also useful for performing data consolidation and migration. Administrators sometimes migrate files and applications from one server to another, to decommission old systems or to consolidate multiple servers into one. Workflow file signatures can also be used for data archival, where administrators archive completed projects or old applications to preserve a historical record.

Also, workflow file signatures can be use for one or more of the following purposes: (1) file hoarding (e.g., to cache, or hoard, data in a mobile device to permit successful execution once the mobile device is disconnected from a network); (2) file searching (file signatures can be used to aid content-based search techniques to improve file search effectiveness); (3) storage performance optimizing (e.g., to improve prefetching, caching, and layout of data); (4) improving energy consumption by storage system (e.g., energy efficiency can be improved by clustering infrequently accessed files onto the same storage devices so that such devices can be powered down or run in standby mode); (5) enabling provenance-awareness (to track lineage of files so that a user or application can determine which files influenced the creation/modification of a given file, or to determine which files are influenced by a given file).

Figure 1:
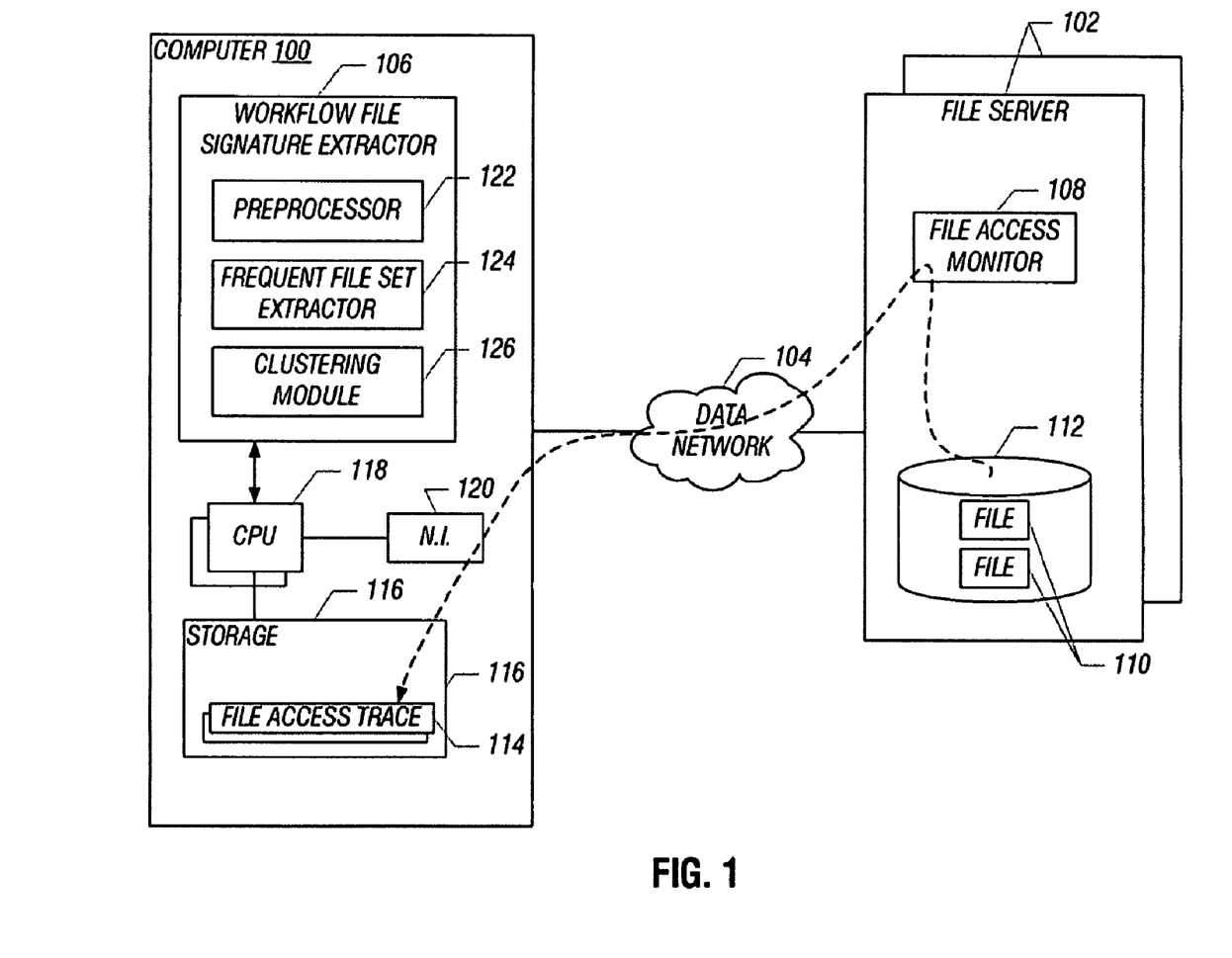
FIG. 1 is a block diagram of an example system in which some embodiments of the invention can be incorporated.

FIG. 1 shows an example arrangement that includes file servers 102 that are interconnected by a data network 104 to a processing computer 100. The processing computer 100 includes a workflow file signature extractor 106 according to some embodiments, where the workflow file signature extractor 106 is executable to determine the file signatures (groups of files) that are associated with corresponding workflows. Although the workflow file signature extractor 106 is depicted as being part of the processing computer 100 that is separate from the file servers 102, note that in a different implementation, the workflow file signature extractor 106 can be provided in one or more of the file servers 102. Thus, although the ensuing description refers to the workflow file signature extractor 106 that is provided in the computer 100 separate from file servers 102, the description also applies to the implementation where the workflow file signature extractor 106 is part of a file server.

Each file server 102 includes a file access monitor 108 to monitor I/O accesses of files 110 stored in a storage 112 associated with the file server 102. The file server 102 (or multiple servers 102) can be part of a storage system (or storage systems). The file access monitor 108 produces a file access trace (trace of file accesses) that can be communicated by the file server 102 over the data network 104 to the processing computer 100, where the file access trace is stored as 114 in a storage 116 of the processing computer 100. Note that the storage 116 can store multiple file access traces 114.

The processing computer 100 also includes one or more central processing units (CPUs) 118 that is (are) connected to the storage 116. The workflow file signature extractor 106 is executable on the one or more CPUs 118. Moreover, a network interface 120 is provided in the processing computer 100 to enable communication over the data network 104 with a remote network element, such as a file server 102. The workflow signature extractor 106 includes a trace preprocessor 122 to perform trace preprocessing, a frequent file set extractor 124 to perform frequent file set extraction, and a clusterizer 126 to perform clustering, as noted above.

Note that the arrangement of FIG. 1 is provided for purposes of example, as other implementations can employ other arrangements.

Generally, the workflow file signature extractor 106 examines a file access trace 114, finds repeated and correlated file accesses, and infers files that are likely to belong to the same workflow. The workflow file signature extractor 106 is able to find workflow file signatures without user intervention; in other words, users do not have to set a relatively large number of parameters, or provide hints and other manually-intensive information to the workflow file signature extractor 106.

Figure 2:
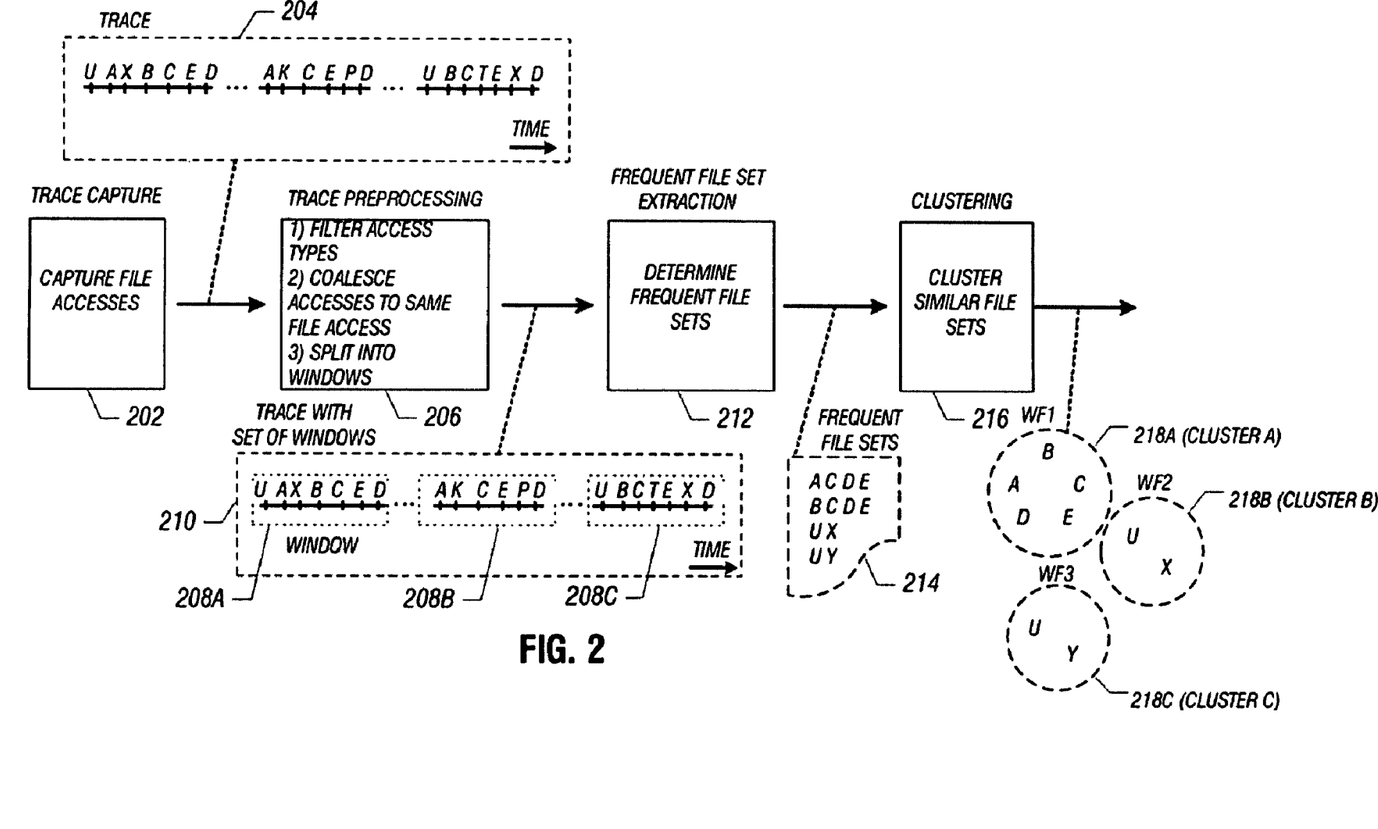
FIG. 2 illustrates an example flow of extracting workflow file signatures, according to an embodiment.

FIG. 2 shows an example flow of extracting workflow file signatures. A trace capture (202) is performed by the file access monitor 108 in the file server 102. In one example, capturing a trace of file accesses refers to capturing just a portion of each file access, such as a header portion of a file access. A "file access" refers to either a request for a file or a response containing the file. Thus, for example, the headers of requests and/or responses can be captured and collected into a trace. The headers contain information identifying the files. In a data network in which TCP/IP (Transmission Control Protocol/Internet Protocol) packets are exchanged among network elements, a TCP-dump procedure can be performed to capture the headers of the TCP packets containing file requests and responses. In other examples, other techniques of capturing portions of file requests and responses can be performed.

The trace capture at 202 produces an example trace 204, which can be communicated by the file server to the processing computer 100 in FIG. 1. The example trace 204 shows just some portion of the entire trace (other file accesses not shown can be part of the trace 204). As depicted in FIG. 2, the trace 204 is provided as an input into a trace preprocessing block 206, which refers to a task performed by the trace preprocessor 122 of FIG. 1. In the trace 204, each letter represents an access of a particular file; for example, "U" refers to an access of file U, "A" refers to an access of file A, and so forth. The trace 204 is a time sequence of file accesses.

In some embodiments, each file can be represented with its file name; alternatively, a file can be represented with a file handle. In one example, each file is represented with [directory handle/file name], which allows for tracking of output files that are often deleted and created again.

In the trace preprocessing block 206, the following subtasks are performed. Requests are filtered so that only certain types of requests are kept. In one example (where an NFS server is used), the types of requests that are kept include GETATTR requests and WRITE requests. A GETATTR request is used to obtain attribute information, and a WRITE request is used to write data to a storage system. READ requests are not kept by the preprocessing block 206 as a result of the filtering, because clients usually cache data, so that a relatively large percentage of READ requests can be satisfied from the cache data at the clients (and therefore will not be submitted to a server). As a result, READ requests that actually reach the file server 102 are not representative of the entire universe of READ requests that may be submitted by clients. The GETATTR request verifies client cache content freshness and generally precedes READ requests. Thus, GETATTR requests can be used to track READ requests to both cached and non-cached files. In other embodiments, other types of requests can be kept or removed by the filtering in the preprocessing block 206.

After filtering is performed, there is no differentiation between GETATTR and WRITE requests. Also, according to some embodiments, to reduce the trace length, requests that recur within a relatively short period of time (e.g., less than 100 milliseconds) can be coalesced into a single file access with the timestamp of the first access.

In the trace preprocessing block 206, the trace is split into shorter access sequences, also referred to as trace fragments. The shorter access sequence (or trace fragment) is a portion of a trace within a predefined time window. In one embodiment, non-overlapping time windows each of fixed length T are defined, where T is a tunable parameter based on an estimate of the length of an episode.

Figure 3:
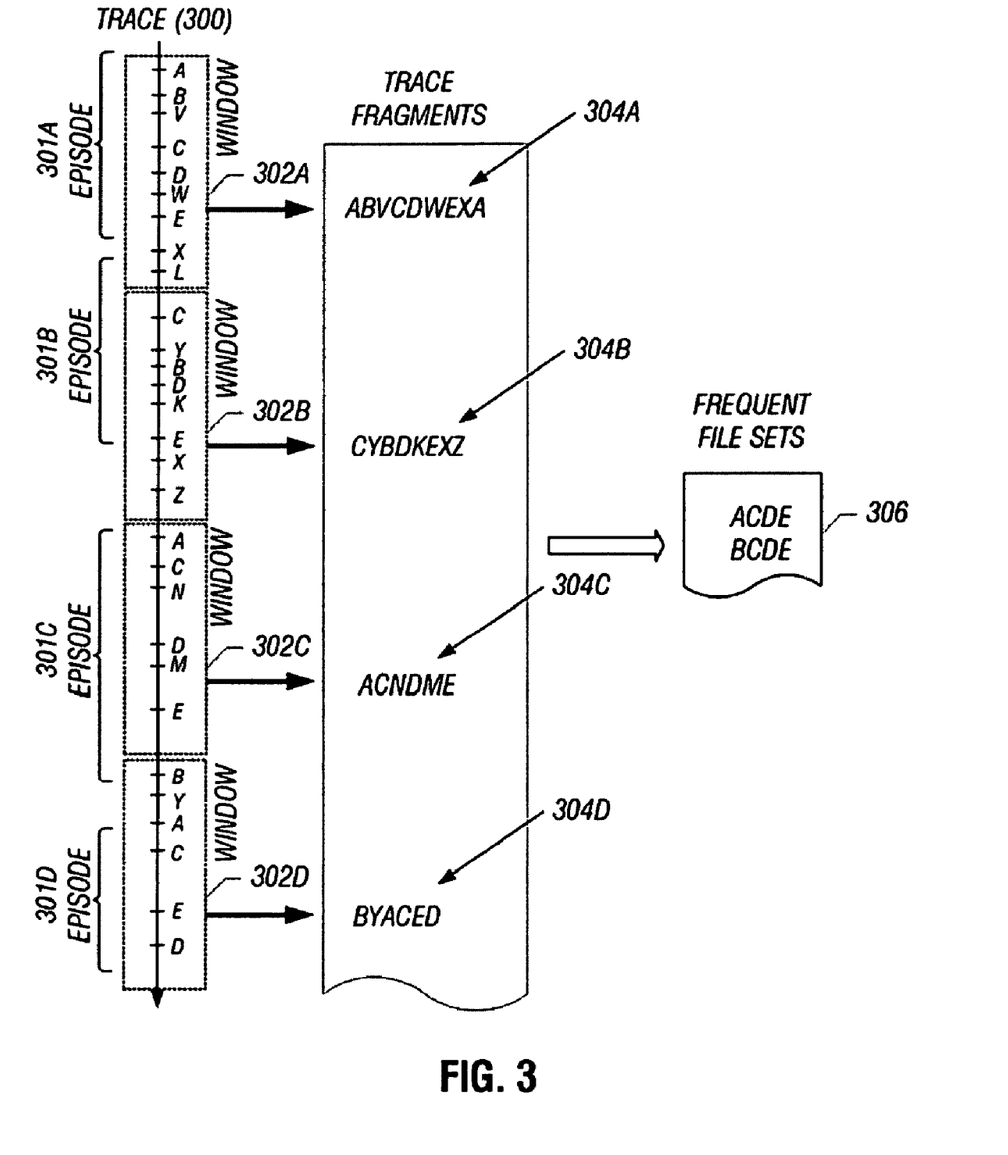
FIG. 3 illustrates an example of performing frequent file set identification, according to an embodiment.

Non-overlapping windows 208A, 208B and 208C are depicted in a trace 210 output from the trace preprocessing block 206. Ideally, it is desired that a trace fragment (and thus the length of each window 208) is long enough to capture an entire episode, but not too long to capture multiple episodes. Note that typically it is hard to determine a priori the exact length of an episode, since the length of an episode varies with the workflow even across different episodes of the same workflow. Thus, the fixed length T of the non-overlapping time windows is designed to be as close as possible to some estimate of an episode length. Note that in some cases, a particular window may be shorter in length than the actual length of an episode, or may be longer in length than an actual episode. As a result, a window may split an episode. A window splitting an episode is depicted in the example of FIG. 3, which will be described further below. To address the above issues, a final clustering task (216 in FIG. 2) is performed, as described further below.

Alternatively, instead of using non-overlapping windows as discussed above, overlapping windows can be used instead.

The trace (210) that has been divided into windows is provided as an input to a frequent file set extraction block 212, which is performed by the frequent file set extractor 124 of FIG. 1. Each of the windows 208A-208C in the trace 210 covers a number of file accesses. For example, window 208A covers accesses of files U, A, X, B, C, E, and D. The frequent file set extraction 212 applies a frequent set mining technique to the trace fragments (contained in windows 208A-208C in the example of FIG. 2) to extract file accesses that occur (or appear) frequently together.

A slightly different frequent file set extraction example is depicted in FIG. 3, where four windows 302A, 302B, 302C, and 302D correspond to four respective trace fragments 304A, 304B, 304C, and 304D of a trace 300. In the FIG. 3 example, four episodes 301A, 301B, 301C, and 301D of a workflow are depicted. Note that the window 302A has a longer length than episode 301A, and thus, the window 302A extends into episode 301B to split episode 301B. Moreover, the window 302C is shorter in length than episode 301C, and as a result, the episode 301C is split by window 302D.

A set of file accesses is considered frequent if it occurs in at least a specified threshold $\tau$ number of trace fragments, where $\tau \geq 2$.

In the FIG. 3 example, the set ACDE occurs in the first, third, and fourth trace fragments 304A, 304C, 304D. If the threshold $\tau$ is three, for example, then ACDE is a frequent set. In this example, BCDE is also a frequent set, since it is found in trace fragments 304A, 304B, and 304D. Note that since the technique according to some embodiments is interested in frequent sets, not sequences, each trace fragment is sorted and duplicate accesses are removed. For example, EDCAE and ACDE become the same set ACDE. In a different embodiment, the sorting and duplicate removal of trace fragments can be omitted.

The smaller the threshold $\tau$ is, the more frequent sets that the trace fragments will contain. Similarly, the algorithm will find fewer frequent sets if the threshold $\tau$ is higher.

The frequent file set extractor 124 extracts only maximal frequent sets (frequent sets not contained in other frequent sets), because maximal frequent sets already have all the information that subsets contain. In the example of FIG. 3, ACDE, BCDE, CDE, and DE are frequent, but the algorithm only extracts ACDE and BCDE (and not CDE or DE, since CDE or DE are already part of ACDE and BCDE). If the threshold $\tau$ is 4, ACDE and BCDE are not frequent, so the algorithm would extract just CDE instead.

Various algorithms can be used for frequent pattern mining, including a CloSpan algorithm, as described in X. Yan et al., entitled "CloSpan: Mining Closed Sequential Patterns In Large Data Sets," in Proc. SIAM Intl. Conf. on Data Mining (May 2003). The CloSpan algorithm is a frequent sequence mining algorithm that efficiently finds maximal frequent sequences. The CloSpan algorithm takes the list of trace fragments and the threshold parameter $\tau$ and outputs the maximal sets of file accesses that occur $\tau$ or more times.

Other algorithms that can be used for frequent pattern mining include the algorithms described in the following: (1) R. Agrawal et al., "Mining Association Rules Between Sets of Items in Large Databases," in Proc. 1993 ACM SIGMOD Intl. Conf. on Management of Data, pages 207-216 (1993); (2) M. Zaki et al., "CHARM: An Efficient Algorithm for Closed Association Rule Mining," in Proc. $2^{nd}$ SIAM Intl. Conf. on Data Mining (2002); and (3) Mohammed J. Zaki, "SPADE: An Efficient Algorithm for Mining Frequent Sequences," Machine Learning, pages 1-31 (2000). Other algorithms can be used in other embodiments.

The two frequent file sets ACDE and BCDE are output at 306 in FIG. 3.

In the slightly different example of FIG. 2, the frequent file set extraction block 212 outputs (214) frequent file sets ACDE, BCDE, UX, and UY. As further depicted in FIG. 2, the frequent file sets 214 are provided as an input to the clustering block 216, as performed by the clusterizer 126 of FIG. 1. The clustering block 216 groups similar file sets to reconstruct the file signature (including one or more files) of a particular workflow. Note that episodes of the same workflow may not access exactly the same files, so the same workflow may result in different frequent file sets for different episodes. In the example of FIG. 3, the same workflow W produced two different frequent file sets, ACDE and BCDE. As a result, it is desired that these two frequent file sets associated with the same workflow W should be combined, to obtain the set ABCDE of all files accessed in the workflow. The set ABCDE would then be considered the file signature of the workflow W.

Another issue is that a window may split an episode, as discussed above, such that the frequent file set extractor 124 will find different frequent file sets corresponding to different parts of the workflow. Thus, the clustering block 216 uses clustering to combine similar frequent file sets and then outputs the union of files in each cluster, which corresponds to a workflow.

Whether or not frequent file sets are clustered together is based on the idea that frequent file sets of the same workflow share more common files than those of different workflows. In accordance with some embodiments, a clustering algorithm that uses a portion of a frequent itemset-based hierarchical clustering (FIHC) algorithm is used. The FIHC algorithm is described in B. C. M Fung et al., "Hierarchical Document Clustering Using Frequent Itemsets," in Proc. SIAM Intl. Conf. on Data Mining (May 2003). According to the FIHC algorithm, each cluster corresponds to documents that share many common words, since documents under the same topic have more common words than documents under different topics. In accordance with some embodiments, a modified version of a portion of the FIHC algorithm is applied by treating a file set as a document, and a file as a word (item) in a document.

The FIHC algorithm described in Fung et al. contains two stages: (1) cluster construction and (2) hierarchical tree building. The first stage is modified in accordance with some embodiments, and the second stage is replaced according to some embodiments. Thus, the clustering algorithm used according to some embodiments has a modified first stage of the FIHC algorithm, and a second stage that is different from the second stage of the FIHC algorithm described in Fung et al.

Figure 4:
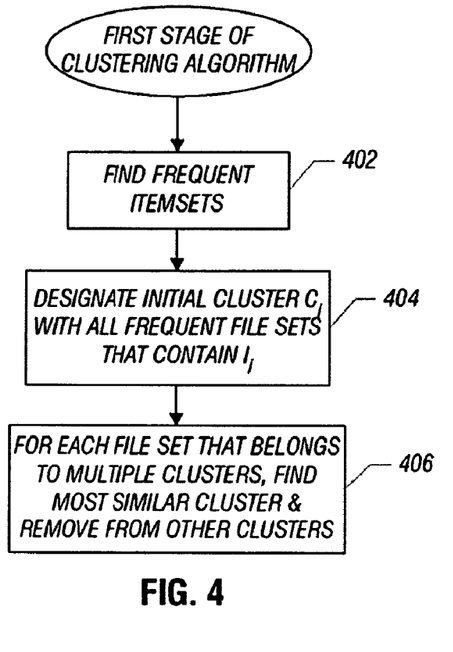
FIGS. 4 and 5 are flow diagrams of a clustering algorithm to determine files associated with a workflow, according to an embodiment.

The input to the clustering algorithm according to some embodiments is a collection of frequent file sets. As depicted in FIG. 4, the first stage of the clustering algorithm starts by finding (at 402) frequent itemsets in the collection of frequent file sets output from the frequent file set extraction block 212. A "frequent itemset" is a set of files contained in at least $\sigma$ frequent file sets, where $\sigma$ is a tunable parameter. The clustering algorithm identifies just maximal frequent itemsets (i.e., itemsets that are not contained in other itemsets). In the FIG. 3 example, assuming $\sigma=2$, one frequent itemset would be CDE, since CDE appears in both file sets ACDE and BCDE. CDE is the maximal frequent itemset—note that CD, DE, and CE are not identified as frequent itemsets because they are already part of the maximal frequent itemset CDE.

For each maximal frequent itemset $I_j$, j=1, . . . n (where n is the number of identified itemsets), the clustering algorithm designates (at 404) an initial cluster $C_j$ with all frequent file sets that contain $I_j$. For example, in FIG. 3, the initial cluster containing frequent itemset CDE would include frequent file sets ACDE and BCDE.

This may result in clusters sharing frequent file sets. To make clusters disjoint, for each frequent file set $F_i$ that belongs to multiple clusters, the clustering algorithm identifies (at 406) the cluster that is most "similar" to $F_i$ and removes $F_i$ from other clusters. To define the "similarity" metric between clusters and frequent file sets, each frequent file set is represented by a feature vector, which is a vector indexed by files containing the frequencies of files in the file set. Each cluster is represented by a vector containing frequencies of files in the union of all frequent file sets in the cluster. The feature vectors contain frequency numbers for files that belong to some maximal frequent itemset (other files are ignored). A file that belongs to some itemset (at least one itemset) is referred to as a "global file." A global file is "cluster frequent" in cluster $C_j$ if the file is contained in some minimum fraction of frequent file sets in $C_j$. The minimum fraction of frequent file sets, in one example, is 5% of the total number of frequent file sets in $C_j$. In other examples, a different minimum fraction can be used.

The frequency numbers in the feature vectors can be weighted according to Term Frequency (TF), where each component of the feature vector (for a frequent file set) indexed by a particular file is the number of times that file appears in the frequent file set, and similarly, each component of the feature vector (for a cluster) indexed by a particular file is the number of times that file appears in the cluster.

In an alternative embodiment, the feature vectors are modified such that frequency numbers are weighted according to whether the file is accessed using GETATTR or WRITE. For example, a greater weight can be assigned to WRITE requests than for GETATTR requests.

Similarity of a file set $F_i$ to a cluster $C_j$ can be computed using the following similarity function that computes a similarity measure Score($C_j \leftarrow F_i$):

$$\text{Score}(C_j \leftarrow F_i) = \left| \sum_x n(x) * clusterSupport(x) \right| - \left| \sum_x n(x') * globalSupport(x') \right|. \quad \text{(Eq. 1)}$$

In Eq. 1, x represents a global file that appears in the file set $F_i$ that is also cluster frequent in cluster $C_j$, and x* represents a global file that appears in the file set $F_i$ that is not cluster frequent in $C_j$. The parameter n(x) is the number of occurrences of x (based on the feature vectors of $F_i$ and $C_j$), and the parameter n(x*) is the number of occurrences of x*. The parameter clusterSupport (x) is the percentage of file sets in the cluster $C_j$ that contain global file x, and globalSupport(x*) is the percentage of file sets containing global file x*.

The first term of Eq. 1 rewards cluster $C_j$ if the global file x in the file set $F_i$ is cluster frequent in $C_j$, but the second term of Eq. 1 penalizes $C_j$ if the global file x* in the file set $F_i$ is not cluster frequent in $C_j$.

The cluster $C_j$ most similar to $F_i$ is the one with the highest Score($C_j \leftarrow F_i$) value. $F_i$ is kept in this most similar $C_j$ (at 406) but removed from other clusters. In this manner, clusters are made disjoint.

Figure 5:
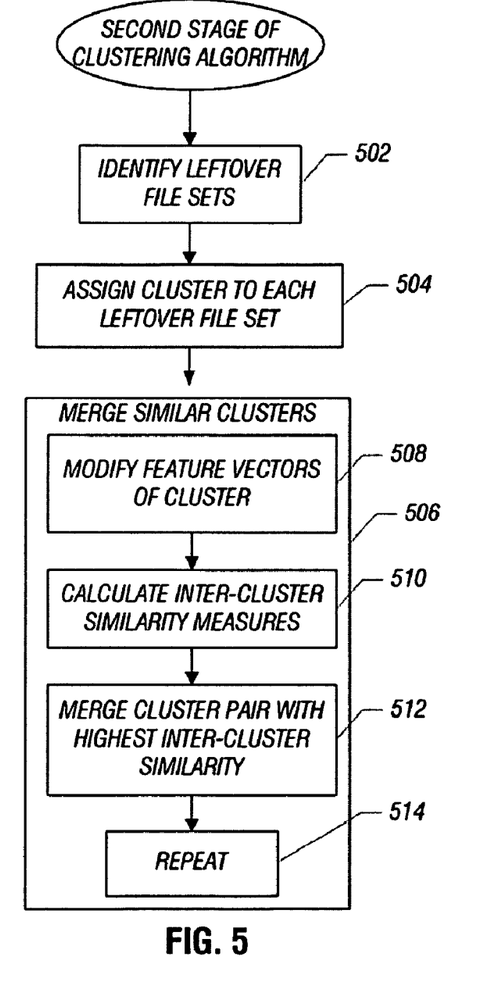

FIG. 5 illustrates the second stage of the clustering algorithm. Frequent file sets that do not contain any frequent itemset remain unclustered in the first stage, and are identified (at 502) as leftover file sets. Leftover file sets correspond to workflows that have little or no variation across episodes. For example, a workflow that always accesses the same set of files would produce just one frequent file set. Therefore, a cluster is assigned (at 504) to each leftover file set. However, the result may be that a workflow results in several such clusters. A similar but more subtle problem is that the first stage of clustering may also create several clusters for the same workflow when a workflow produces different file sets containing different frequent itemsets. To address these issues, similar clusters are merged (at 506) as follows.

First, the feature vectors used to represent clusters are modified (at 508). Recall that the feature vectors contain only files that appear in some frequent itemset (in other words, feature vectors contain only global files). In this case, a leftover file set would have a zero (null) vector associated with it (by definition of a leftover file set). Thus, feature vectors are modified (at 508) to contain frequencies of all files in the original trace. For each pair of clusters, inter-cluster similarity measures are calculated (at 510). The similarity measures are similar to the Score values of Eq. 1, except now all files are considered rather than just global files (a global file is a file that appears in some frequent itemset). To measure the inter-cluster similarity between cluster $C_p$ and $C_q$, the similarity of $C_p$ to $C_q$ is measured, and the similarity of $C_q$ to $C_p$ is measured. One of the clusters is treated as a file set by combining all the file sets in the cluster into one file set. The similarity measure is then calculated similar to Eq. 1, except that the similarity measure for two clusters $C_k$ and $C_l$ is normalized:

$$Sim(C_k \leftarrow C_l) = \frac{\text{Score}(C_k \leftarrow \text{fileset}(C_l))}{\sum_x n(x) + \sum_{x'} n(x')} + 1, \quad \text{(Eq. 2)}$$

where fileset($C_l$) is the combination of all file sets in $C_l$ into one file set. Note that x and x* in Eq. 2 refers to any file in the original trace, not just a global file.

The inter-cluster similarity between $C_p$ and $C_q$ is then equal to the geometric mean of $Sim(C_p \leftarrow C_q)$ and $Sim(C_q \leftarrow C_p)$. Next, the cluster pair that has the highest score (inter-cluster similarity) is merged (at 512). The procedure is repeated (at 514) as long as there are clusters that are more similar than dissimilar.

The result of the clustering algorithm includes clusters of files, such as clusters 218A, 218B, and 218C in FIG. 2. Each cluster corresponds to a workflow; thus, cluster 218A corresponds to workflow WF1, cluster 218B corresponds to workflow WF2, and cluster 218C corresponds to workflow WF3. The union of all files within a cluster is taken to produce the files that are accessed by the corresponding workflow.

By using the workflow file signature extractor according to some embodiments, a robust and efficient technique is provided for identifying sets of files associated with different workflows. The identification of file signatures can be performed even with relatively limited amounts of information, such as based on traces monitored at file servers or other types of servers. Moreover, since the identification of workflow file signatures is based on sequences of accesses, the workflow file signature extractor can potentially infer more accurate results (such as relationships that involve more than just a pair of files), and the file signature extraction can scale better. Moreover, the file signature extractor would be able to find relationships between different episodes of the same workflow, even if those episodes do not access exactly the same file set(s).

Instructions of software described above (including the workflow file signature extractor 106 and its sub-modules of FIG. 1) are loaded for execution on a processor (such as one or more CPUs 118 in FIG. 1). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of determining files associated with one or more workflows, comprising:
receiving a trace of accesses of files in at least one server;
grouping the files into at least one set of files, wherein the files in the set are accessed together more than a predetermined number of times in the trace; and
identifying files associated with a particular workflow based on the at least one set; and
dividing the trace into a plurality of trace fragments, wherein grouping the files into the at least one set of files comprises grouping the files into the at least one set of files that appear together in more than the predetermined number of trace fragments.

2. The method of claim 1, wherein the at least one set used in identifying the files associated with the particular workflow is a maximal set.

3. The method of claim 1, wherein dividing the trace into the plurality of trace fragments comprises dividing the trace into the plurality of trace fragments using windows each having a predetermined size.

4. The method of claim 1, wherein receiving the trace of accesses comprises receiving the trace of accesses at a file server.

5. A method of determining files associated with one or more workflows, comprising:
receiving a trace of accesses of files in at least one server;
grouping the files into plural sets of files, wherein each set includes files that appear together more than a predetermined number of times in the trace; and
identifying files associated with a particular workflow based on the plural sets of files.

6. The method of claim 5, further comprising:
clustering the plural sets of files to combine at least some of the plural sets, wherein the combining produces the identified files associated with the particular workflow.

7. The method of claim 6, wherein the plural sets of files are referred to as frequent sets, wherein clustering the plural frequent sets comprises:
finding at least one frequent itemset that includes a collection of files contained in at least a predefined number of the frequent sets; and
designating a first initial cluster that includes all frequent sets that contain the frequent itemset.

8. The method of claim 7, further comprising:
finding a second frequent itemset that includes another collection of files in at least the predefined number of the frequent sets;
designating a second initial cluster that includes all frequent sets that contain the second frequent itemset; and
removing a particular file set that appears in both the first and second initial clusters from one of the first and second initial clusters based on a similarity metric relating the particular file set to the first and second initial clusters.

9. The method of claim 6, wherein clustering the plural sets comprises:
    identifying leftover sets of the files that do not belong to any cluster; and
    assigning a cluster to each of the leftover sets.

10. The method of claim 6, wherein clustering the plural sets comprises:
    identifying plural clusters; and
    merging at least some of the plural clusters based on similarities among the clusters.

11. The method of claim 5, further comprising:
    identifying files associated with another workflow based on the plural sets.

12. The method of claim 5, further comprising:
    filtering the accesses in the trace to remove at least one type of accesses prior to the grouping.

13. A method of identifying a file signature associated with a workflow, comprising:
    receiving a trace of accesses of files in at least one server;
    dividing the trace into plural trace fragments;
    performing frequent file set extraction to identify file sets, the file sets containing corresponding collections of files that appear in multiple ones of the trace fragments; and
    identifying files associated with the workflow based on the file sets.

14. The method of claim 13, wherein dividing the trace into the plural trace fragments comprises defining plural windows each of a predefined size, wherein corresponding portions of the trace are provided in the respective windows to define the trace fragments.

15. The method of claim 13, wherein performing the frequent file set extraction comprises identifying file sets each containing a corresponding collection of files that appear together in at least some predetermined number of trace fragments.

16. The method of claim 13, further comprising applying a clustering algorithm to the file sets to identify the files associated with the workflow.

17. The method of claim 16, wherein applying the clustering algorithm comprises:
    identifying clusters containing files of the file sets; and
    merging the clusters based on inter-cluster similarity metrics.

18. The method of claim 13, further comprising using the identified file signature for a purpose selected from among: (1) managing of file placement in a tiered storage system; (2) understanding utilization of a storage resource; (3) performing data consolidation; (4) performing data migration; (5) performing data archival; (6) file hoarding; (7) optimizing storage performance; (8) improving energy efficiency; and (9) enabling provenance awareness.

19. An article comprising at least one storage medium containing instructions that when executed cause a computer to:
    receive a trace of accesses of files in at least one server;
    group the files into plural sets of files, wherein the files in each of the sets are accessed together more than a predetermined number of times in the trace; and
    identify files associated with a particular workflow based on the plural sets.

20. The article of claim 19, wherein the instructions when executed cause the computer to further cluster the plural sets of files to combine at least some of the plural sets, wherein the combining produces the identified files associated with the particular workflow.

21. The article of claim 20, wherein clustering the plural sets comprises:
    identifying plural clusters; and
    merging at least some of the plural clusters based on similarities among the clusters.

* * * * *